United States Patent Office 2,982,681
Patented May 2, 1961

2,982,681

COMPOSITE STRUCTURE

Edward Crampsey, Dennis Grady, and Philip Richard Hawtin, all of Spondon, near Derby, England, assignors to British Celanese Limited, a corporation of Great Britain No Drawing. Filed Dec. 30, 1957, Ser. No. 705,742

Claims priority, application Great Britain Jan. 11, 1957

5 Claims. (Cl. 154—46)

This invention relates to polymers, and especially to copolymers of vinyl acetate, and to adhesives based on the said copolymers, and their use in bonding cellulose ester film to printed paper.

Considerable difficulty has hitherto been experienced in finding a suitable adhesive for bonding thin films of cellulose acetate or other organic ester of cellulose to heavily printed paper at temperatures below the softening point of the film by methods capable of being run continuously at relatively high speeds, e.g. 3 to 15 metres per minute. An adhesive for this purpose must be sufficiently soft and tacky during the bonding operation to form a uniform coating over the film; it must adhere to the film, to the paper and to the ink on the paper; it must be strong and flexible at ordinary temperatures and must remain so; and it must retain its adhesion to the film and the printed paper for long periods.

In attempting to satisfy the exacting requirements outlined above, very many combinations of various polymers, including polymers and copolymers of vinyl acetate and of acrylic acid esters, with single and mixed plasticisers, some compatible with the cellulose ester, some with the polymer and some with printing ink binders, were investigated, but with very little success. By careful formulation it was found possible to obtain sufficiently good initial adhesion but on storage the adhesion was found to fall off, accompanied usually by the development of brittleness either in the film or the adhesive or both. This loss of adhesion and development of brittleness appeared to be due to migration of plasticiser from the film into the adhesive and/or from the adhesive into the film or into the ink. With an adhesive based on a copolymer of vinyl chloride, vinyl acetate and maleic anhydride, for instance, plasticised with a mixture of dibutylphthalate and trichlorethyl phosphate and dissolved in a mixture of toluene and methyl ethyl ketone, a satisfactory initial adhesion was obtained but adhesion broke down after several months owing apparently to migration of plasticiser from the adhesive into the film. Many attempts were made, by incorporating in the adhesive a proportion of plasticiser of lower compatability with the cellulose acetate, to obtain an adhesive that did not suffer from this defect, but all these attempts were unsuccessful. Until the present invention was made the nearest approach to success after several years' work on the problem was given by a solution in benzene of plasticised acrylic acid copolymer. This composition, however, had obvious disadvantages. One of these was the toxic nature of the solvent. It was found impossible to replace this by a non-toxic solvent without either weakening the adhesion obtained or damaging the film. Finally, it was found that excellent long-term adhesion could be obtained by using as the adhesive a copolymer of vinyl acetate with dibutyl maleate the copolymer containing 35 to 50% e.g. 35 to 45% by weight of combined vinyl acetate. This copolymer can be employed in the presence or absence of plasticiser and dissolved in a non-toxic volatile solvent, such as isopropanol, or isopropyl acetate, which does not adversely affect cellulose acetate film. Moreover, adhesives having a basis of the copolymer can be used in bonding films of other thermoplastic substitution derivatives of cellulose to printed surfaces, especially surfaces of cellulose (including regenerated cellulose). The invention includes broadly structures comprising a film of a thermoplastic substitution derivative of cellulose bonded to a printed surface by means of an adhesive having a basis of a copolymer of vinyl acetate and a dibutyl maleate, said copolymer containing 35 to 50% by weight of combined vinyl acetate.

In the composite structures of the invention those in which the cellulose derivative is a cellulose ester of a paraffinic monocarboxylic acid containing 2 to 4 carbon atoms, and especially those in which the cellulose ester is cellulose acetate, are of most importance. Thermoplastic substitution derivatives other than cellulose acetate from which the film employed in such structures can be made include: thermoplastic organic esters such as cellulose propionate, cellulose butyrate, cellulose acetate-propionate, cellulose acetate-butyrate, and thermoplastic cellulose ethers such as ethyl cellulose, as well as cellulose nitrate.

The printed surface must of course be one for which a suitable printing ink can be formulated and to which the copolymer adheres. The surface may, for instance, be that of aluminum foil or of rubber hydrochloride film or may be a surface of polythene rendered receptive to printing, e.g. by an electrical corona discharge treatment or by a flame treatment. Of particular importance, however, are composite structures in which the ink printed surface is of cellulose (including regenerated cellulose). Such a cellulose surface may, for instance, be that of paper, cardboard or other paper-like product having a basis of cellulose fibres, or of a film of regenerated cellulose. These surfaces, in contrast say with the surface of textile fabrics, may be termed "unitary surfaces" in that though they may be formed of fibres, as in paper, they are not formed by numerous independently movable elements of surface. It is with such unitary surfaces especially when smooth, as in films, metal foils and glazed paper, and when heavily printed, that bonding by means of the adhesives of the invention shows to most advantage.

The term "printed surface" is to be regarded as meaning a surface to certain areas only of which there has been applied (in any way) a white, black or coloured pigment in a vehicle containing a binder.

In the copolymer forming the basis of the adhesive the dibutyl maleate is preferably the di-n-butyl or di-isobutyl ester.

An adhesive particularly suitable for bonding film of cellulose acetate containing 52 to 56% of combined acetic acid to printed paper comprises a copolymer of the kind specified above in solution in an alcohol or ester boiling below 100° C. which is not a solvent or strong swelling agent for such cellulose acetate. The solvent may, for example be a saturated aliphatic alcohol containing 2 to 3 carbon atoms, especially commercial ethanol or isopropanol. (The term "isopropanol" throughout the specification is used to mean the azeotropic mixture with water sold commercially as "isopropanol.") A suitable ester is isopropyl acetate.

In the preferred method of making the adhesives of the invention the copolymer is made by bulk polymerisation initiated by a free-radical polymerisation initiator that is soluble in the monomer mixture and after at least 75% of the monomer mixture has polymerised the solvent is mixed with the polymer to form a solution thereof. In general polymerisation can be carried as far as 80% or even 85% conversion (based on total initial monomer) without undue difficulty in stirring even in the absence of solvent, but as polymerisation continues the great increase in viscosity calls for a progressively increasing expenditure of power in stirring. It has been found best, therefore, to add solvent after 75 to 85% conversion. Further polymerisation can then be effected, e.g. to 90% or even to 95% conversion, and with a view to so increasing the conversion additional initiator may be added with the solvent. The additional polymer formed after the addition of solvent is likely to be of much lower average molecular weight than that formed before the addition, especially when the solvent has a strong chain-transfer action as have the alcohols. The presence of the low molecular fraction, however, does not appear disadvantageous and it may function advantageously as a plasticiser. On the other hand, an undue proportion of low molecular polymer may give the solution a lower viscosity than is required. It might be thought that this could easily be remedied by adding a proportion of copolymer of high molecular weight, i.e. of intrinsic viscosity at least 0.5, e.g. 0.5 to 0.6, made to low conversion. (Intrinsic viscosities referred to in this specification are determined in 1% solution in commercial isopropanol at 25° C.) We have found however, that such addition may cause separation into two phases, but that if the high molecular weight copolymer be present in solution in the initial monomer mixture a homogeneous solution of relatively high viscosity can be obtained even when the last portion of copolymer formed is of substantially lower average molecular weight than that formed before the addition of solvent. It is of advantage for the viscosity of the solution finally obtained to be in the range 450 to 550 cps., e.g. 500 to 525 cps., at 25° C. To obtain such solutions of suitable concentration, i.e. 20 to 45% and preferably 20 to 30%, it is desirable for the intrinsic viscosity of the copolymer to be within the range 0.45 to 0.55.

The initiator used in the polymerisation may be an organic peroxy compound soluble in the monomer mixture, e.g. benzoyl peroxide or lauryl peroxide, or a monomer soluble azo-di-nitrile e.g. azo-bis-isobutyronitrile.

If desired a plasticiser for cellulose acetate may be incorporated in the solution. Suitable plasticisers include: di-methoxyethyl phthalate, tri-(2-chlorethyl) phosphate, triphenyl phosphate and chlorinated diphenyl. The proportion of plasticiser should be relatively low, e.g. 10 to 20% and preferably 10 to 15%, of the weight of the polymer.

The following examples illustrate the invention. In the examples and throughout the specification unless otherwise stated, all parts and percentages are by weight.

*Example 1*

The charge was as follows:

250 parts of di-n-butyl maleate.
250 parts of vinyl acetate.
1.25 parts of benzoyl peroxide.

This charge was run into a polymerisation vessel provided with robust stirring means, inlet for nitrogen and reflux condenser, after flushing the vessel out with nitrogen. The charge was heated at 60–80° C. under an atmosphere of nitrogen for 40 hours. The polymer so formed was dissolved in situ by running into the vessel 600 parts of commercial isopropanol (containing 10% of water) and continuing the stirring until solution was complete.

*Example 2*

The process was carried out as described in Example 1 except that: only 0.5 part of benzoyl peroxide were employed, the polymerisation was carried out at 80 to 85° C., and the isopropanol was added after the polymerisation had been continued for 9 hours. The conversion (based on total monomer content) at this stage was approximately 85%.

*Example 3*

A reaction mixture of the following composition was made:

50 parts of vinyl acetate.
50 parts of di-n-butyl maleate.
0.1 part of azo-bis-isobutyronitrile.

Into a vitreous-enamel lined vessel with reflux condenser and enamelled stirrer, and heated to 80° C. by means of a steam jacket, 50 parts of the reaction mixture was charged and stirring was started. Further additions of 15, 15 and 20 parts respectively of the reaction mixture were made at 60 minute intervals. At 5 hours after the start, by which time the conversion was approximately 80% based on the initial monomer mixture, the addition of 20 parts of isopropanol was begun and was finished in 90 minutes. The reaction mixture was heated for a further 2 hours and then discharged from the reaction vessel, cooled and diluted with additional isopropanol to 30% solids content.

*Example 4*

The process was carried out as in Example 3 except that: there was added with the 20 parts of isopropanol (first addition) an additional 0.1 part of azo-bis-isobutyronitrile and the heating was maintained for 2½ hours after finishing this addition and before discharging the reaction mixture. The conversion was then 95% based on the initial total monomer.

*Example 5*

35 parts of polyvinyl acetate of high molecular weight were dissolved in 65 parts of vinyl acetate. 38 parts of this solution were mixed with 25 parts of di-n-butyl maleate and 0.2 part of benzoyl peroxide. The mixture was polymerised for 24 hours at 80 to 81° C., by which time the conversion was 95% based on the total monomer. The product gave a smooth solution in commercial isopropanol. A 21% solution of the polymer in isopropanol had a viscosity of 503 cps.

*Example 6*

The process was carried out as in Example 4 except that industrial ethanol was used instead of isopropanol so obtaining a more volatile solution.

*Example 7*

The process was carried out as in Example 4 but using isopropyl acetate instead of the isopropanol.

*Example 8*

A reaction mixture of the following composition was prepared:

10 parts of di-isobutyl maleate.
10 parts of vinyl acetate.
4 parts of isopropyl acetate.
0.02 part of azo-bis-isobutyronitrile.

Polymerisation was carried out at a temperature of 80° C. for 24 hours by which time the conversion, based on total monomer, was 84%. The reaction mixture was cooled and diluted with additional isopropyl acetate to give a solution containing 22% by weight of solids.

*Example 9*

This example illustrates the bonding.

The film employed was 1 mil thick and composed of cellulose acetate containing 52 to 54% combined acetic acid plasticised with a mixture of diethyl phthalate and triphenyl phosphate in the ratio of 3:1. The printed web was a heavily printed glazed paper.

The bonding was effected on a film laminating machine in which the film is drawn from a spool into contact with a furnishing roll dipping into a trough of the adhesive, and from there runs up one side and down the other side of a drying tower and then through the nip of a pair of horizontal rolls where it is bonded to the printed paper and the laminate then passes to a take-up roll. The upper nip roll is of nickel plated steel and is heated by hot water. The lower nip roll is covered with synthetic rubber and is urged towards the upper roll by hydraulic pressure. The paper fed into the nip is slightly wider than the film to avoid any contact of the coated surface of the film with the rolls.

In effecting the bonding the adhesive trough was fed with the copolymer solution obtained by one of the processes of Examples 1 to 8; the drying tower was supplied with a current of air at a temperature between 60 and 80° C. according to the volatility of the solvent, the speed of the machine was adjusted so that the coating on the film was substantially dry on leaving the tower; and the upper nip roll was heated to a temperature between 60 and 70° C.

With all the solutions of Examples 1 to 8 good adhesion was retained both to the printed and unprinted parts of the paper after three months' storage. There was a slight tendency of the laminates to curl but this was not considered serious.

*Examples 10 to 17*

There was mixed into the solutions of Examples 1 to 8 respectively 15% based on the weight of copolymer, of di-methoxyethyl phthalate.

When used in the process of Example 9 each of these solutions gave equally good adhesion accompanied by reduced tendency to curl.

*Examples 18 to 25*

These examples were carried out as Examples 10 to 17 respectively but using instead of the di-methoxyethyl phthalate a 50% mixture of this with chlorinated diphenyl. The tendency of the laminate to curl was reduced.

*Examples 26 to 33*

These examples were carried out as Examples 18 to 25 respectively but substituting triphenyl phosphate for chlorinated diphenyl. The tendency of the laminate to curl was reduced.

Having described our invention, what we desire to secure by Letters Patent is:

1. A composite structure comprising a film of a cellulose ester of a paraffinic monocarboxylic acid containing from 2 to 4 carbon atoms in the molecule and an ink-printed surface, the said film and said printed surface being bonded together by means of an adhesive having a basis of a copolymer of vinyl acetate and an ester chosen from the group consisting of di-n-butyl maleate and di-isobutyl maleate, said copolymer containing 35 to 50 percent by weight of combined vinyl acetate.

2. A composite structure as claimed in claim 1 wherein the printed surface is a unitary surface of cellulose.

3. A composite structure as claimed in claim 2 wherein the printed surface is of paper.

4. A composite structure as claimed in claim 1 wherein the cellulose ester film is a cellulose acetate film.

5. A composite structure as claimed in claim 4 wherein the adhesive also includes a plasticiser for cellulose acetate chosen from the group consisting of di-methoxyethyl phthalate, tri-phenyl phosphate and chlorinated diphenyl.

References Cited in the file of this patent

UNITED STATES PATENTS

| | | |
|---|---|---|
| 1,972,448 | Jenkins | Sept. 4, 1934 |
| 1,983,870 | Ostwald | Dec. 11, 1934 |
| 2,137,636 | Barrett | Nov. 22, 1938 |
| 2,200,437 | Voss | May 14, 1940 |
| 2,410,089 | Lundquist et al. | Oct. 29, 1946 |
| 2,430,564 | Gordon | Nov. 11, 1947 |

FOREIGN PATENTS

| | | |
|---|---|---|
| 581,473 | Great Britain | Oct. 14, 1946 |